United States Patent Office 2,993,246
Patented July 25, 1961

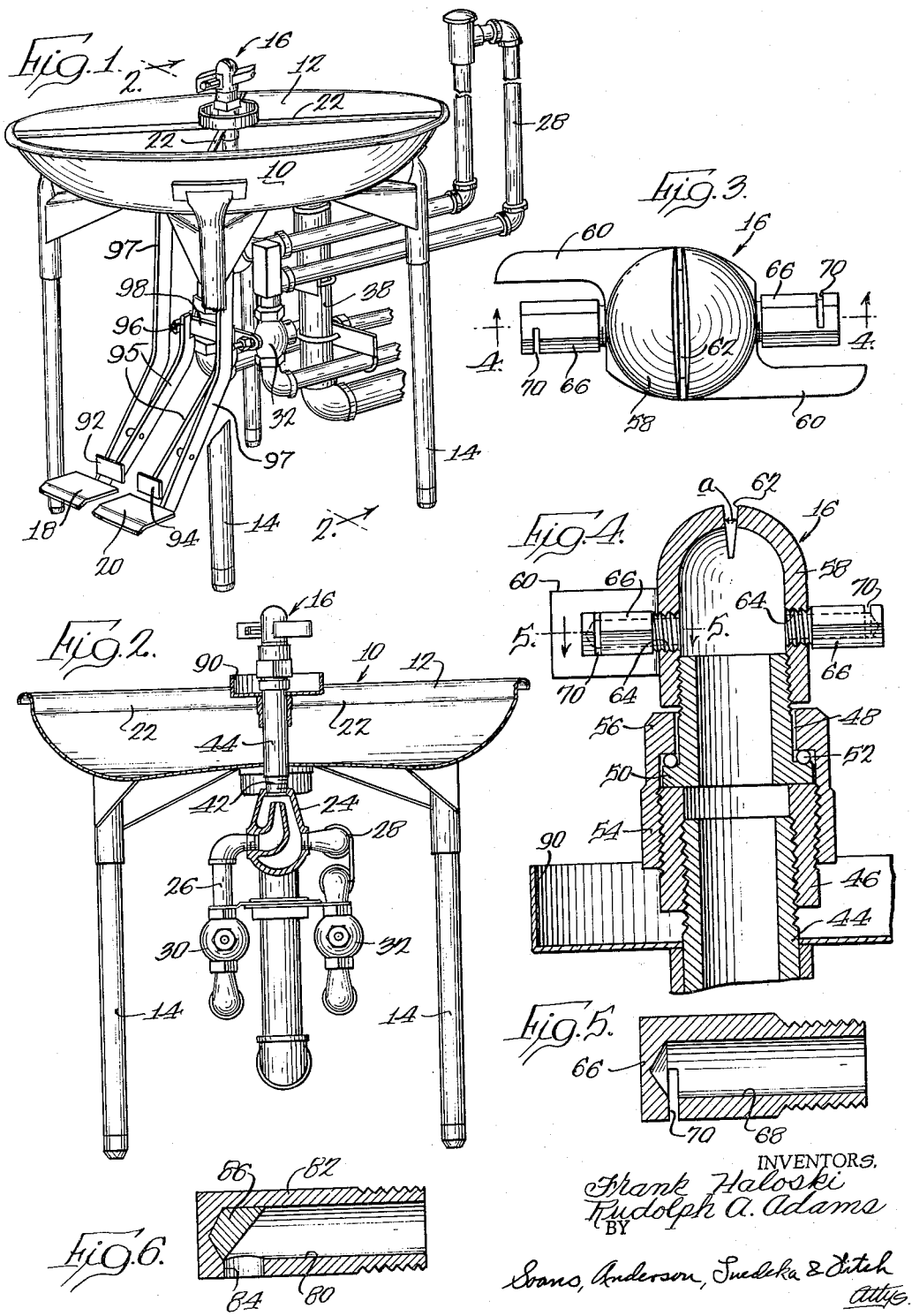

2,993,246
SPRAY STERILIZER
Frank Haloski, Downers Grove, Ill., and Rudolph A. Adams, Eau Claire, Mich., assignors to Vacuum Can Company, a corporation of Illinois
Filed Sept. 18, 1957, Ser. No. 684,665
4 Claims. (Cl. 21—79)

This invention relates generally to sterilizers and is particularly directed to a novel and practical form of apparatus for sanitizing food containers and the like.

In the handling of fluids and semi-fluids in relatively large quantities, particularly food and beverages such as milk, coffee and the like, it is generally desirable, if not necessary, to use rather large metal containers. However, such containers do present problems with respect to cleaning and sterilizing the containers each time before they are filled. For convenience in handling, filling and pouring, the containers are usually made in the general form of elongated cylinders having an opening at the upper end which is somewhat reduced in size with respect to the main diameter of the container. The length of the container and the narrowing opening or neck at its upper end have made it difficult to thoroughly clean and sterilize the inside of the container in any reasonable length of time. Various pressurized steam and water spray means have been employed in the rinsing and sterilizing of such containers, but such prior devices have not been entirely satisfactory, both with respect to the results achieved and with respect to the time required for the processing of each container.

It is the primary object of the present invention to provide an improved form of container sterilizer, which includes novel means for directing a liquid or vapor spray over the entirely inner surface of a container. Another object of the invention is to provide a container sterilizer and rinser which includes a fluid pressure operated, rotatable spray means that is effective to wash the entire inner surface of the container with a scouring action. A further object of this invention is to provide a novel spray means for a container sterilizer, which spray means is rotatable under fluid pressure and is selectively directed to provide a complete coverage of the surrounding areas.

Additional objects and advantages will be noted with respect to the description of the selected embodiment of the invention, which is illustrated in the accompanying drawings, wherein:

FIGURE 1 is a perspective view of a sterilizer.
FIGURE 2 is a sectional view taken generally along the line 2—2 in FIGURE 1.
FIGURE 3 is an enlarged plan view of the spray nozzle seen in FIGURES 1 and 2.
FIGURE 4 is a sectional view of the nozzle taken along the line 4—4 in FIGURE 3.
FIGURE 5 is an enlarged sectional view taken along the line 5—5 in FIGURE 4.
FIGURE 6 is a cross-sectional view, similar to that in FIGURE 5, of a modified form of nozzle.

As seen generally in FIGURE 1 of the drawings, the selected embodiment of this invention comprises a sterilizer 10, which is particularly adapted to the handling of relatively large size containers, such as milk cans, garbage cans and the like. However, it will be noted that the sterilizer is designed to handle smaller containers as well. The sterilizer 10 includes a large bowl 12 supported by four tubular leg members 14, a spray nozzle 16 for directing water and/or steam under pressure upwardly from the bowl, and a pair of foot pedals 18 and 20 for controlling the flow of the water and steam respectively. A pair of rods 22 are disposed at right angles with respect to each other across the upper portion of the bowl 12, in order to provide means for supporting the containers which are to be rinsed and sterilized in the proper position with respect to the spray nozzle 16. As illustrated, the spray nozzle 16 is preferably mounted above the rim of the bowl 12, in order to prevent back siphoning and contamination of the nozzle. Similarly, the cross rods 22 suspend the containers being sanitized above the bottom of the bowl to prevent re-contamination of the container and provide a more thorough sanitizing of the container.

Suitable plumbing is provided for directing the water and steam from the source to the spray nozzle. In the illustrated embodiment, the plumbing includes a mixing chamber 24 (FIG. 2) having fluid connection with a source of steam under pressure through a pipe 26 and with a source of water under pressure through another pipe line 28. Each of these pipes includes a self-closing valve 30 and 32, respectively, controlled in a suitable manner by the foot pedals 18 and 20, respectively, to thereby afford means for selectively directing the flow of water and/or steam through the mixing chamber 24 and upwardly into the spray nozzle 16. If desired, both pedals may be operated simultaneously to thereby provide for a mixture of water and steam in the spray nozzle. It will be understood, of course, that both the steam and the water are under pressure.

A suitable drain pipe 38 is provided for the bowl, and there is also preferably provided a vacuum breaker 40 in the water line 28. Since the particular means for providing pressurized steam and water for the spray nozzle 16 is not an essential portion of the invention and any suitable means may be employed for this purpose, it is believed that a more detailed description of the plumbing connections between the sterilizer and the source of steam and water is unnecessary.

The upper portion of the mixing chamber 24 includes an internally threaded opening into which a nipple 42 (FIG. 2) is threaded. The upper end of the nipple 42 is connected to a pipe 44 which is fixed to the center of the bowl 12 and provides a supporting connection for the spray nozzle 16.

As seen particularly in FIGURE 4, the spray nozzle assembly 16 includes a reducer bushing 46 having an internally threaded portion for engaging the threads on the upper end of the supporting pipe section 44. On top of the reducer bushing 46 there is mounted a male bearing sleeve 48 which has a flange portion 50 at its lower end formed to provide a circumferential recess or groove for receiving a plurality of ball bearings 52. A female bearing sleeve 54 is disposed circumferentially of the male bearing sleeve 48 and is threaded at its lower end on to the reducer bushing 46. The upper end of the female bearing sleeve includes an inwardly turned flange portion 56 which has a downwardly facing surface providing a retaining means and bearing surface for the steel balls 52.

The upper end of the male bearing sleeve 48 includes an externally threaded portion which engages an internally threaded portion of a central spray nozzle 58. This nozzle 58 has fixed thereto a pair of laterally extending blades or guards 60, which preferably form a continuation of opposed side portions of the spray nozzle 58. The blades 60 extend from the nozzle 58 in opposite directions and in generally parallel relation to each other. It will be noted that the hub or central portion of the nozzle 58 has a generally hemispherical top which is provided with a slotted opening or orifice 62 along its diameter. As noted particularly in FIGURE 4, this opening 62 is fan shaped and is generally symmetrical with respect to the main diameter of the nozzle. In the illustrated embodiment, the fan shaped opening or spray has a dimension of about 3/32 of an inch at its center and tapers inwardly at its outer ends to a reduced opening of about 1/32 inch. These dimensions have proven satisfactory in connection with a nozzle wherein the central portion has an internal diameter of 15/16 of an inch. It will be realized, of course, that the dimensions of this opening may be varied to suit the requirements. It is desirable, however, that the spray opening 62 extend substantially the width of the central portion of the nozzle in order to provide a maximum amount of coverage for the spray. The angle of the opening, as indicated at "a" in FIGURE 4, of course, will depend somewhat upon the shape of the containers being sterilized. With the ordinary five-gallon milk can it has been found to be desirable to make the angle of this opening 62 such that it provide a spray of about 5° transversely of the length of the opening.

At diametrically opposed positions on the side of the center nozzle 58 there is provided a pair of threaded passageways 64, each of which receive the threaded end portion of a spray jet 66. Each of these spray jets includes a center bore 68 and a transverse slot 70 near the outer end of the jet, which slot is rectangular in shape and extends approximately half way around the center bore of the jet. It will be noted that each of the jets 66 is disposed in adjacent relation to the laterally projecting blades 60, so that the latter serve as a protection for the jets. The emission of pressure fluid through these jet nozzles, provides the necessary force for propelling the entire nozzle assembly 16 in a circular path about its center. Consequently, the openings in the ends of the jets 66 must be disposed so that the forces created by the passage of water and/or steam therethrough will not be entirely in opposition to each other so as to prevent rotation of the nozzle assembly. For example, as seen in FIGURE 3, the jets 66 are placed with their openings 70 facing in generally opposite directions. In this way the force of the water or steam emitted from each jet complements the force from the other jet and the two jets cooperate in providing a turning or rotation of the entire nozzle assembly 16. This action can, of course, be modified by adjusting the position of the two jet nozzles. For example, it has been found desirable and advantageous to have one of the jet openings 70 facing generally horizontally, while the other opening 70 is tilted upwardly at an angle less than 90 degrees with respect to the horizontal, as indicated in FIGURES 3 and 4. In this way, the main prepelling force is provided by the horizontally directed jet opening, on the left in FIGURES 3 and 4, while the remaining jet is primarily serving to cover the upper wall surface areas in the container being sterilized. In addition, the fan-shaped spray through the opening 62 in the center nozzle 58 provides a scrubbing action on the side walls and bottom of the container. It should also be noted that, in the illustrated arrangement, the upwardly directed pressure in the nozzle assembly 16 serves to move the male bearing sleeve 48 in an upward direction, so that the lower end of this sleeve is essentially free of the reducer bushing 46 and the entire nozzle assembly is supported on the bearing surface provided by the flange 56 of the female bearing sleeve 54 through the steel balls 52.

It will be seen, therefore, that the nozzle assembly 16 rotates as the pressure fluid is being directed through the fan spray opening 62 and through the pair of jet nozzles 66. The rate of rotation will, of course, depend upon the disposition of the jet nozzles, the size of the openings 70 at the outer end of these jets, and the pressure of the fluid being delivered to the nozzle assembly 16. However, the particular speed of rotation is not important, except with respect to its effect on the path of the sprays being delivered to the inner surfaces of the container that is being sterilized and rinsed. It is desirable, of course, to correlate the rotation of the nozzle assembly 16 with the disposition of the jets 66 and the fan spray opening 62, so that a stream of water is directed against substantially the entire inside surface of the container. In this respect, the disposition of the jet nozzles 66 can be adjusted and the jets can be varied in design, to accommodate almost any given size and shape of container. Moreover, the angle of spray afforded by the fan-spray opening 62 can also be changed to meet a change in circumstances, if such is desired.

While the jet nozzles 66 shown in FIGURES 3 and 4 have proven to be quite satisfactory, various forms of similar nozzles might be made without departing from the principles of this invention. As noted particularly in FIGURE 5, the selected jet nozzles 66 comprise generally a fitting having an inner bore 68 communicating with the central nozzle 58 and with a semi-cylindrical slotted opening 70 at the outer end of the jet. The width and size of this slotted opening 70 will, of course, affect the shape of the jet flow delivered, as well as the velocity of the rotatable nozzle assembly.

Another suitable form of jet nozzle is illustrated in FIGURE 6, wherein the center bore 80 of a jet 82 is partially filled at its outer end, as indicated at 86, and the bore 80 communicates with a transversely disposed, circular opening or passage 84. This arrangement provides for a somewhat less abrupt change in the direction of the flow of fluid through the jet and, therefore, affords an improved flow with less frictional resistance. An arrangement of this type, wherein provision is made for a more gradual change in the direction of fluid flow, might also be used in connection with a slotted recess or opening in place of the circular opening 84. It will be understood that the particular configuration of the passageways and the size and shape of the orifice at the outer end of the jet nozzle can be varied to meet any particular requirement. Also, it will be apparent that the jets 66 and 82 are readily removable from the main nozzle assembly and, therefore, various shapes and sizes of jet nozzle might be used interchangeably. Since these jets are preferably of a soft metal such as bronze, the blades 60 offer protection for the jet nozzles during the placement of the container over the spray and during the rotation of the nozzle assembly.

Looking again at FIGURE 1, it will be understood that the container to be rinsed and sterilized will be inverted over the nozzle assembly 16, with the container being supported at its mouth by the transverse rods 22. In this respect, there is preferably provided a stationary guard for the nozzle, which comprises a cylindrical member 90 having a diameter greater than that of the path of rotation of the blades 60 and in position to prevent interference with the latter by the side of a container placed over the nozzle 16. The water and/or steam is then introduced through the nozzle assembly 16 by operation of the foot pedals 18 and 20, or in any other desired manner. The container remains stationary on the sterilizer as the nozzle assembly rotates in the above described manner, to thereby afford a pressurized spray of fluid against the side walls and bottom of the container without requiring the operator to shift the position of the container. The circular action provided by the rotating spray nozzle is particularly effective in thoroughly sterilizing and rinsing the container, and the changing direction of the water spray from the nozzle 16 insures the cleansing and sanitizing of all surfaces, including any seams, corners, and the like in the container. In the event that the container is to be used for hot liquids, it will be apparent that the container can be pre-heated by the application of steam through the rotating nozzle.

The illustrated embodiment also includes novel safety-locking mechanism in connection with the pedals 18 and 20 which operate the water and steam valves 32 and 30, respectively, in the system. Since hot water and/or steam is usually employed in sanitizing food containers, it is important that some precaution be taken to prevent an accidental discharge of hot water or steam on the operator of the sanitizer. As seen in FIGURE 1, there is provided safety locks for the control pedals 18 and 20 in the form of a pair of toe-pedals 92 and 94. These pedals are fixed, respectively, to the lower ends of a pair of arms 95 which are pivotally supported on the pivotally suspended levers 97 that carry the foot pedals 18 and 20. The upper end portion 96 of each arm 95 is notched for latching engagement with a fixed bar 98 on the sterilizer, so that movement of the arm 95, as well as the associated lever 97, is prevented when the notched end 96 on the arm engages the bar 98.

The toe-pedals 92 and 94 are disposed adjacent the inner edge of the foot pedals 18 and 20, so that they are engageable by the toe of the person operating the foot pedals. Consequently, the foot pedals 18 and 20 can only be operated to provide for a flow of fluid through the valves 30 and 32 when the associated toe-pedal 92 or 94 is also engaged and moved inwardly to thereby release the latch portion 96 and free the lever 97 for swinging movement. As the levers 97 are moved inwardly of the sterilizer, they engage the self-closing valves 30 and 32 and thereby provide for fluid flow to the nozzle 16.

It is seen, therefore, that there is provided an improved form of sterilizer which is particularly effective in sanitizing containers, as by rinsing and sterilizing, and which performs its task thoroughly and with a minimum amount of time and effort required. Moreover, the described nozzle assembly is adjustable and affords a ready exchange of removable parts to best adapt the sterilizer to any size and shape of container. Then too, certain of the adjustments provided for the nozzle assembly can be used to more effectively utilize the existing water pressures whether such pressure be low or high. It will also be noted that the nozzle spray assembly described herein is essentially self-supporting during its operation, due to the described novel relationship between the reducer bushing 46 and the elements 48 and 54 of the nozzle assembly 16.

Although shown and described with respect to particular structure, it will be apparent that various modifications might be made without departing from the principles of this invention.

We claim:

1. Apparatus for sanitizing containers, comprising a bowl structure, means on said bowl structure for supporting an open end container in inverted elevated relation thereto, a nozzle assembly carried by said bowl and disposed above said container supporting means in position whereby the container can be placed over said nozzle assembly in fixed, inverted relation thereto with the open end of the container resting on said supporting means, said nozzle assembly comprising a center spray portion mounted for rotation about a generally vertical axis relative to said bowl and the container supported thereon, said center spray portion having an elongated opening across its upper end to direct fluid generally upwardly, and said nozzle assembly also including a laterally extending jet nozzle adjustably carried by said center spray portion at a position below the elongated opening across said center spray portion, said jet nozzle having fluid communication with the interior of said center spray portion and including a fluid discharge opening adjacent its free end which is adjustably positionable to direct a stream of fluid through a path which is spaced from the axis of said center spray portion so as to provide rotation of said nozzle assembly and to direct fluid against the interior wall of the container at positions thereon below said elongated opening in said center spray.

2. Apparatus for sanitizing containers, comprising a bowl structure, means on said bowl structure for supporting an open end container in inverted elevated relation thereto, a rotatable nozzle assembly carried by said bowl and disposed above said container supporting means in position whereby the container can be placed over said nozzle assembly in fixed, inverted relation thereto with the open end of the container resting on said supporting means, said nozzle assembly comprising a generally hemi-spherical center spray portion mounted for rotation about a generally vertical axis relative to said bowl and the container supported thereon, said center spray portion having an elongated transverse opening across its upper surface to direct a spray of fluid generally upwardly in a fan-shaped path, and said nozzle assembly also including a pair of laterally extending jet nozzles carried by said center spray portion at a position thereon below the elongated opening in the upper surface of said center spray, said jet nozzles having fluid communication with the interior of said center spray portion and each including an adjustably positionable fluid discharge opening adjacent its free end adapted to be positioned to direct a stream of fluid which is spaced from the axis of said center spray portion with the stream being at least in part below the level of the spray from said center spray portion, whereby the discharge of fluid from said jet nozzles provides for rotation of said nozzle assembly and directs fluid against the lower, interior wall of the container.

3. Apparatus for sanitizing containers, comprising a bowl structure, means for supporting an open end container in inverted elevated relation to said bowl structure, a nozzle assembly carried by said bowl and disposed in elevated relation thereto, means mounting said nozzle assembly for rotation relative to said bowl and the container supported thereon about a generally vertical axis, said nozzle assembly including a center spray portion with a generally hemi-spherical top having an elongated orifice across said top, said orifice diminishing in width toward the opposite ends thereof and including a pair of side walls which are disposed in outwardly diverging relation to each other to thereby produce an upwardly directed fan-like spray as fluid is discharged through the orifice, and said nozzle assembly also including a pair of laterally extending jet nozzles carried by said center spray portion at a position thereon below said orifice, said jet nozzles each having fluid communication with the interior of said center spray portion and including a fluid discharge opening adjacent its free end which is adjustably positionable to direct a stream of fluid from a position spaced from the axis of said center spray portion and in angular relation thereto so as to provide rotation of said nozzle assembly and to direct fluid against the interior wall of the container covering said nozzle assembly.

4. Apparatus for sanitizing containers, comprising a bowl structure, means carried at the upper part of said bowl structure for supporting an open end container in inverted elevated relation thereto, a nozzle assembly carried by said bowl and disposed centrally of said container supporting means in elevated relation thereto, whereby the open end of the container can be placed over said nozzle assembly and supported on said support means in vertically extending relation to said bowl structure, means mounting said nozzle assembly for rotation relative to said bowl and the container supported thereon about a generally vertical axis, said nozzle assembly including a center spray portion with a generally hemi-spherical top having an elongated orifice across said top to thereby produce an upwardly directed fan-like spray as fluid is discharged through the orifice, and said nozzle assembly also including a pair of laterally extending jet nozzles carried by said center spray portion at a position below said orifice, each of said jet nozzles having fluid communication with the interior of said center spray portion and including an adjustably positionable slotted opening adjacent its outer end providing a fluid discharge opening in position to direct a generally planar stream of fluid through a path spaced from the axis of said center spray portion and in angular relation thereto toward the sides of the container so as to provide rotation of said nozzle assembly and to direct fluid primarily against the lower interior wall of the container covering said nozzle assembly, and means providing fluid communication between the interior of said center spray portion and a source of pressure fluid, whereby the introduction of pressure fluid into said center spray portion affords a simultaneous discharge of fluid through said elongated orifice and through said slotted discharge openings of said jet nozzles toward the interior wall of the container.

References Cited in the file of this patent

UNITED STATES PATENTS

| | | |
|---|---|---|
| 1,281,493 | Blanks | Oct. 15, 1918 |
| 1,298,973 | Leahy | Apr. 1, 1919 |
| 2,062,664 | Kendall | Dec. 1, 1936 |
| 2,753,211 | Hubbard | July 3, 1956 |
| 2,764,171 | Nolte | Sept. 25, 1956 |